(12) United States Patent
Boden

(10) Patent No.: US 6,929,279 B2
(45) Date of Patent: Aug. 16, 2005

(54) HOOD SUPPORT MECHANISM

(75) Inventor: Shane Michael Boden, Waverly, IA (US)

(73) Assignee: Deere & Company, Moline, IL (US)

( * ) Notice: Subject to any disclaimer, the term of this patent is extended or adjusted under 35 U.S.C. 154(b) by 57 days.

(21) Appl. No.: 10/649,568

(22) Filed: Aug. 27, 2003

(65) Prior Publication Data

US 2005/0045395 A1 Mar. 3, 2005

(51) Int. Cl.$^7$ ............................................. B62D 25/10
(52) U.S. Cl. .................. 280/477; 180/69.2; 180/69.21; 296/100.08
(58) Field of Search .............................. 180/69.2, 69.21; 16/306, 289, 291, 288; 296/100.1, 100.8, 100.9; 280/477

(56) References Cited

U.S. PATENT DOCUMENTS

| | | | | |
|---|---|---|---|---|
| 2,322,630 | A | * | 6/1943 | Greig ...................... 180/69.21 |
| 3,351,975 | A | * | 11/1967 | Goto ........................... 16/288 |
| 3,815,176 | A | * | 6/1974 | Porter ......................... 16/288 |
| 3,955,241 | A | * | 5/1976 | Little .......................... 16/298 |
| 5,136,752 | A | * | 8/1992 | Bening et al. ................ 16/287 |
| 5,339,494 | A | * | 8/1994 | Esau et al. .................... 16/294 |
| 5,435,406 | A | * | 7/1995 | Gaffoglio et al. ......... 180/69.21 |
| 5,503,450 | A | * | 4/1996 | Miller ................... 296/100.08 |
| 5,564,514 | A | * | 10/1996 | Knight .................... 180/69.21 |
| 5,645,133 | A | * | 7/1997 | Thompson et al. ...... 180/69.21 |
| 6,213,235 | B1 | * | 4/2001 | Elhardt et al. ............. 180/69.2 |
| 6,487,754 | B1 | * | 12/2002 | Keen .......................... 16/306 |
| 6,499,189 | B2 | * | 12/2002 | Kondo et al. ................ 16/289 |

* cited by examiner

Primary Examiner—Christopher P. Ellis
Assistant Examiner—Kelly E Campbell

(57) ABSTRACT

A support mechanism supports a hood in a raised position with respect to a vehicle to which the hood is pivotally coupled. The mechanism includes two pairs of arm members which are pivotally coupled to each other by a central pivot pin, and which are coupled between the vehicle and the vehicle hood. A flat coil spring is coiled around the central pivot pin and is attached to the arm members. The spring is biased to pivot one pair of arms and in turn the hood upwardly.

6 Claims, 4 Drawing Sheets

HOOD SUPPORT MECHANISM

BACKGROUND OF THE INVENTION

The present invention relates generally to a support mechanism for a hood which covers a vehicle engine and other components of a vehicle, such as an agricultural or industrial vehicle. Agricultural tractors in particular have very tight width constraints at the rear of the hood for visibility. It is a known practice to use gas springs to support the hood of a vehicle, such as an agricultural tractor. Such vehicle hoods are long and heavy and require a significant amount of force to balance the hood. While gas springs allow for a compact design along the inside of the hood, they are prone to failure as they wear out or lose their gas charge, and their force is variable as the temperature varies. Further, the use of gas springs on each side of the hood does not provide stiffness against torsion imparted to the hood from wind or sideways pull from closing the hood while standing beside it. Some known hood supports also require a catch or a separate prop rod to hold a hood in a raised position. Accordingly, there is a clear need in the art for a hood support mechanism which avoids the use of gas springs, which does not require a catch or a prop rod and which provides significant clearance under the hood.

SUMMARY OF THE INVENTION

In view of the foregoing, it is an object of the invention to provide a hood support mechanism.

Another object of the invention is the provision of such a hood support mechanism which avoids the use of gas springs.

A further object of the invention is to provide such a hood support mechanism which has a long life and which eliminates the need for a catch or separate prop rod.

An additional object of the invention is to provide a hood support mechanism which maintains adequate clearance under the hood.

The foregoing and other objects of the invention together with the advantages thereof over the known art which will become apparent from the detailed specification which follows are attained by a support mechanism for supporting a hood with respect to a vehicle to which the hood is pivotally coupled, the support mechanism comprising: a pair of laterally spaced first arms each having a first end pivotally coupled to the vehicle and having a second end; a pair of laterally spaced second arms each having a first end pivotally coupled to the second end of one of the first arms, and having a second end for engaging and supporting the hood; a resilient member coupled between the first and second arms and biased to urge the second ends of the second arms upwardly and towards the hood.

In general, a support mechanism supports a hood in a raised position with respect to a vehicle to which the hood is pivotally coupled. The mechanism includes two pairs of arm members which are pivotally coupled to each other by a central pivot pin, and which are coupled between the vehicle and the vehicle hood. A flat coil spring is coiled around the central pivot pin and is attached to the arm members. The spring is biased to pivot one pair of arms and in turn the hood upwardly.

To acquaint persons skilled in the art most closely related to the present invention, one preferred embodiment of the invention that illustrates the best mode now contemplated for putting the invention into practice is described herein by and with reference to, the annexed drawings that form a part of the specification. The exemplary embodiment is described in detail without attempting to show all of the various forms and modifications in which the invention might be embodied. As such, the embodiment shown and described herein is illustrative, and as will become apparent to those skilled in the art, can be modified in numerous ways within the spirit and scope of the invention—the invention being measured by the appended claims and not by the details of the specification.

BRIEF DESCRIPTION OF THE DRAWINGS

For a complete understanding of the objects, techniques, and structure of the invention reference should be made to the following detailed description and accompanying drawings, wherein.

DESCRIPTION OF THE PREFERRED EMBODIMENT

Figure 1:
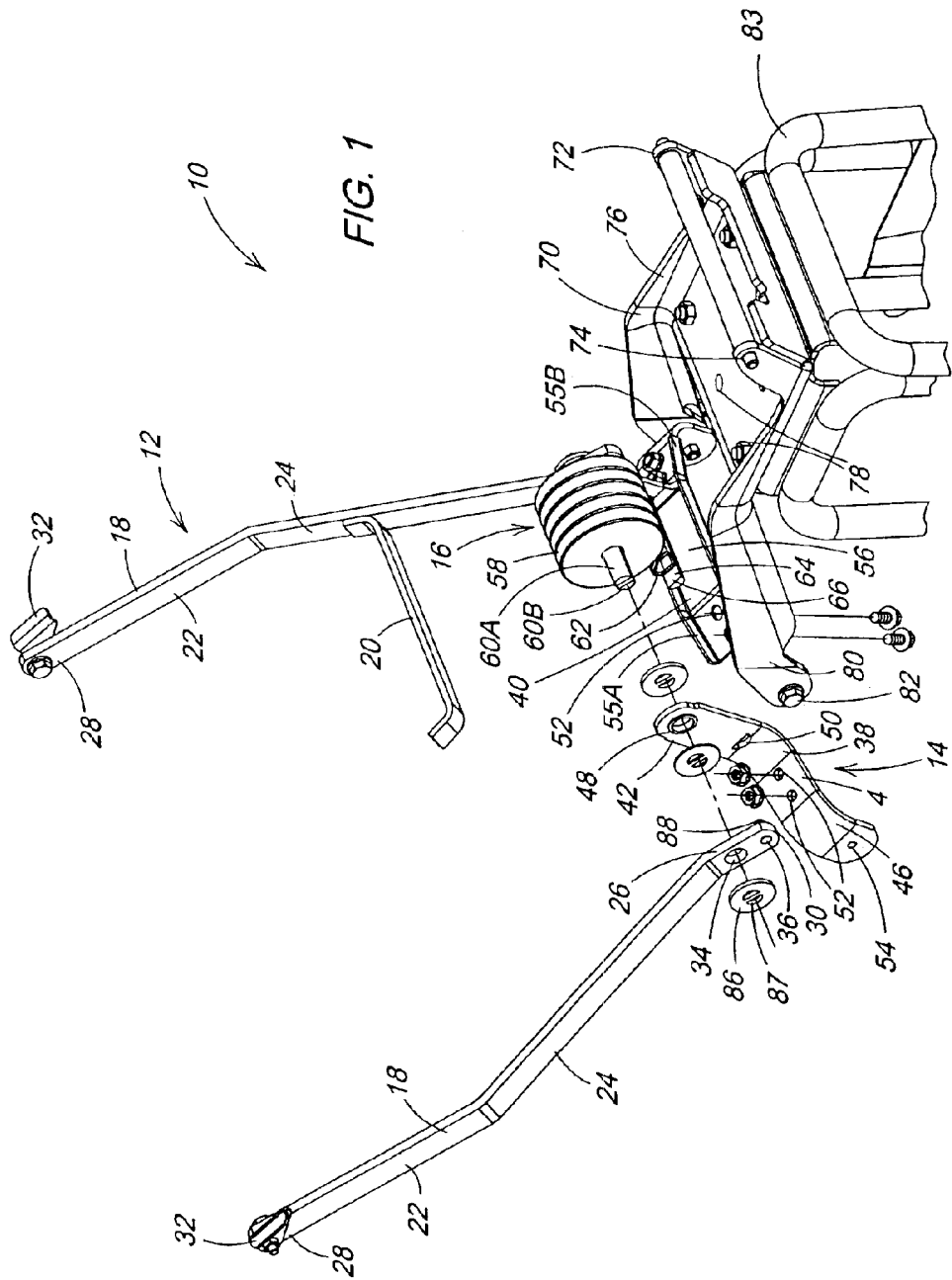
FIG. 1 is an exploded perspective view of a hood support mechanism according to the invention.

With reference now to the drawings and more particularly to FIG. 1, it can be seen that a hood support mechanism according to the invention is designated generally by the numeral 10. The hood support mechanism 10 is generally comprised of a hood arm assembly 12, a spring arm assembly 14, and a spring assembly 16. The hood arm assembly 12 comprises a pair of hood arms 18 joined together by a brace 20. As can be seen each hood arm 18 has a first portion 22, a second portion 24 disposed at an angle to the first portion 22, and a third portion 26 disposed at an angle to the second portion 24. The angles of first portion 22 and third portion 26 are generally parallel with one another. Brace 20 is welded or otherwise affixed to the second portion 24 of the hood arms 18 and maintains the hood arms 18 in a spaced relationship to one another such that the first portions 22 and third portions 26 are respectively parallel to one another. Because of the angles of the hood arms 18, the distance between the first ends 28 of the hood arms 18 is substantially larger than the distance between the second ends 30 of the hood arms 18. Hood mounting flanges 32 are pivotally affixed to the first ends 28 of the hood arms 18 so that the hood arms 18 can be readily attached to the hood of a vehicle. For reasons which will become apparent as the detailed description continues, the second ends 30 of the hood arms 18 each include a first aperture 34 and a second aperture 36.

The spring arm assembly 14 comprises a pair of spring arms 38 and a brace 40. Each spring arm 38 is generally characterized by a first portion 42, a second portion 44 disposed at an angle to the first portion 42, and a third portion 46 disposed at an angle to the second portion 44. As can be seen, first portion 42 includes a spring aperture 48 and a half-moon aperture 50. Second portion 44 includes a pair of brace mounting apertures 52. Third portion 46 includes an arm mounting aperture 54. Brace 40 includes end portions 55A and 55B and a center portion 56. As can be seen end portions 55A and 55B of brace 40 each include apertures 58 which correspond to the brace mounting apertures 52 of spring arms 38. It can further be seen that the end portions 55A and 55B of brace 40 are angled relative to the center portion 56 such that when spring arms 38 are mounted to the brace 40, the spring arms 38 are maintained in a spaced relationship to one another with the first portion 42 and third portion 46 of one spring arm 38 being substantially parallel to the first portion 42 and third portion 46, respectively, of the other spring arm 38. It will also be noted that when the spring arms 38 are assembled to the brace 40 the distance between the generally parallel third portions 46 is substantially greater than the distance between the generally parallel first portions 42.

Spring assembly 16 is comprised of one or more spring members 58 preferably in the form of wound torsion springs. Each torsion spring 58 has a first end (not shown) which is captured between two half-moon pins 60A and 60B that together form a central pivot pin 60. Each torsion spring 58 is thus wound around the central pivot pin 60 in a coiled fashion with a second end of each spring forming a hook shaped terminus 62. For reasons which will become apparent as the detailed description continues, the hook shaped terminus 62 is designed to abut the flat surface portion 66 of a half-moon pin 64.

Figure 2:
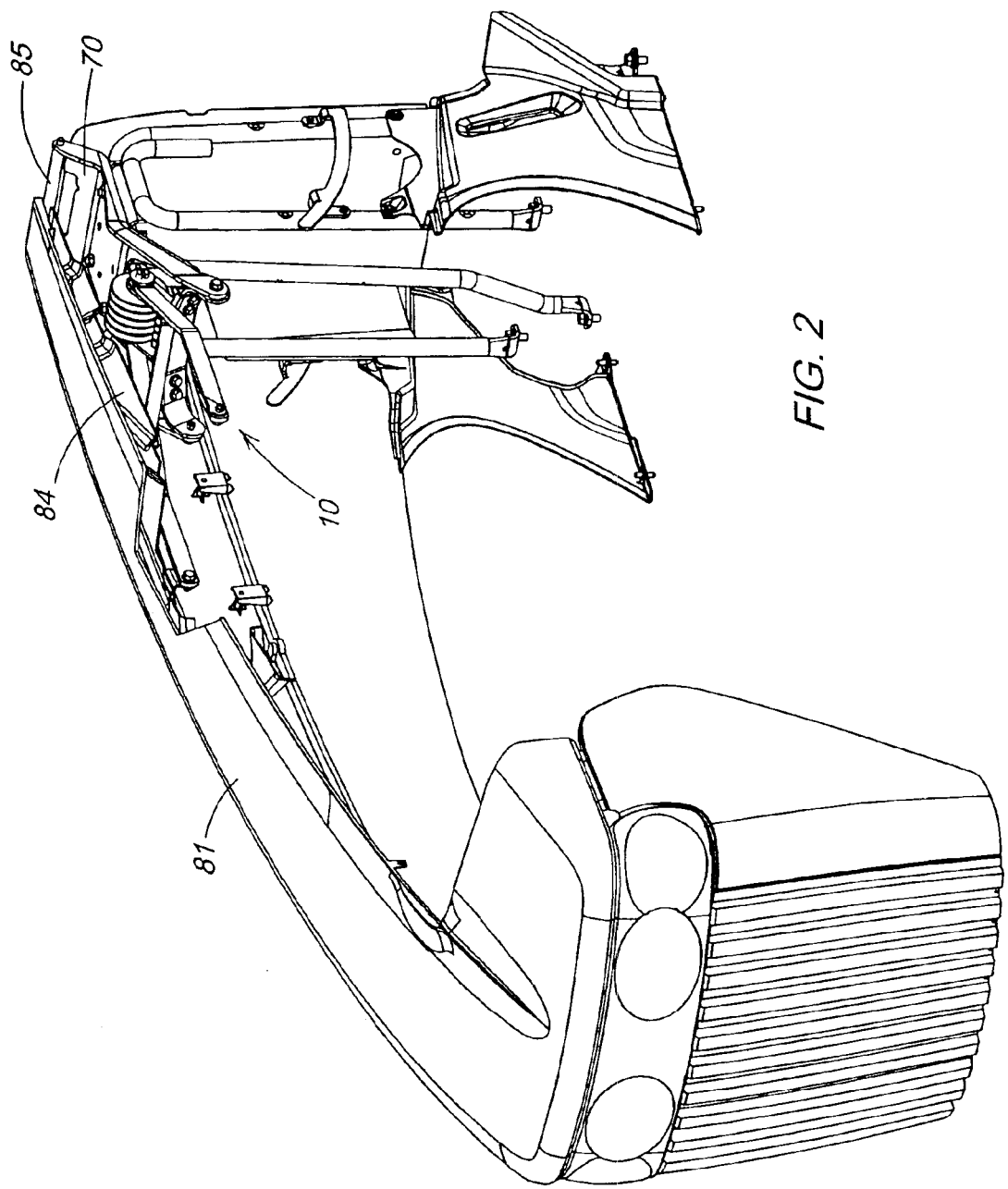
FIG. 2 is a partially cut-away perspective view of a vehicle hood assembly incorporating the hood support mechanism according to the invention.

In addition to the sub-assemblies described above the hood support mechanism 10 further comprises a hinge bracket 70 which serves both as pivot for the hood and an attachment point for the spring arm assembly 14, as well as a means for securing the entire assembly to the vehicle frame. Accordingly, the hinge bracket 70 has an upper end portion 72 having a pair of hinge pivot apertures 74, an intermediate portion 76 having a plurality of frame mounting apertures 78, and a lower end portion 80 having a pair of spring arm mounting apertures 82. The hinge bracket 70 is thus secured to a support portion 83 of the vehicle frame via the frame mounting apertures 78 using appropriate bolts or the like. With reference to FIG. 2 it will be seen that the hood 81 is mounted to the hinge bracket 70 by way of a hood support structure 84 that is pivotally secured at one end thereof to the hinge pivot apertures 74 by an appropriate pivot rod 85 or the like.

Figure 3:
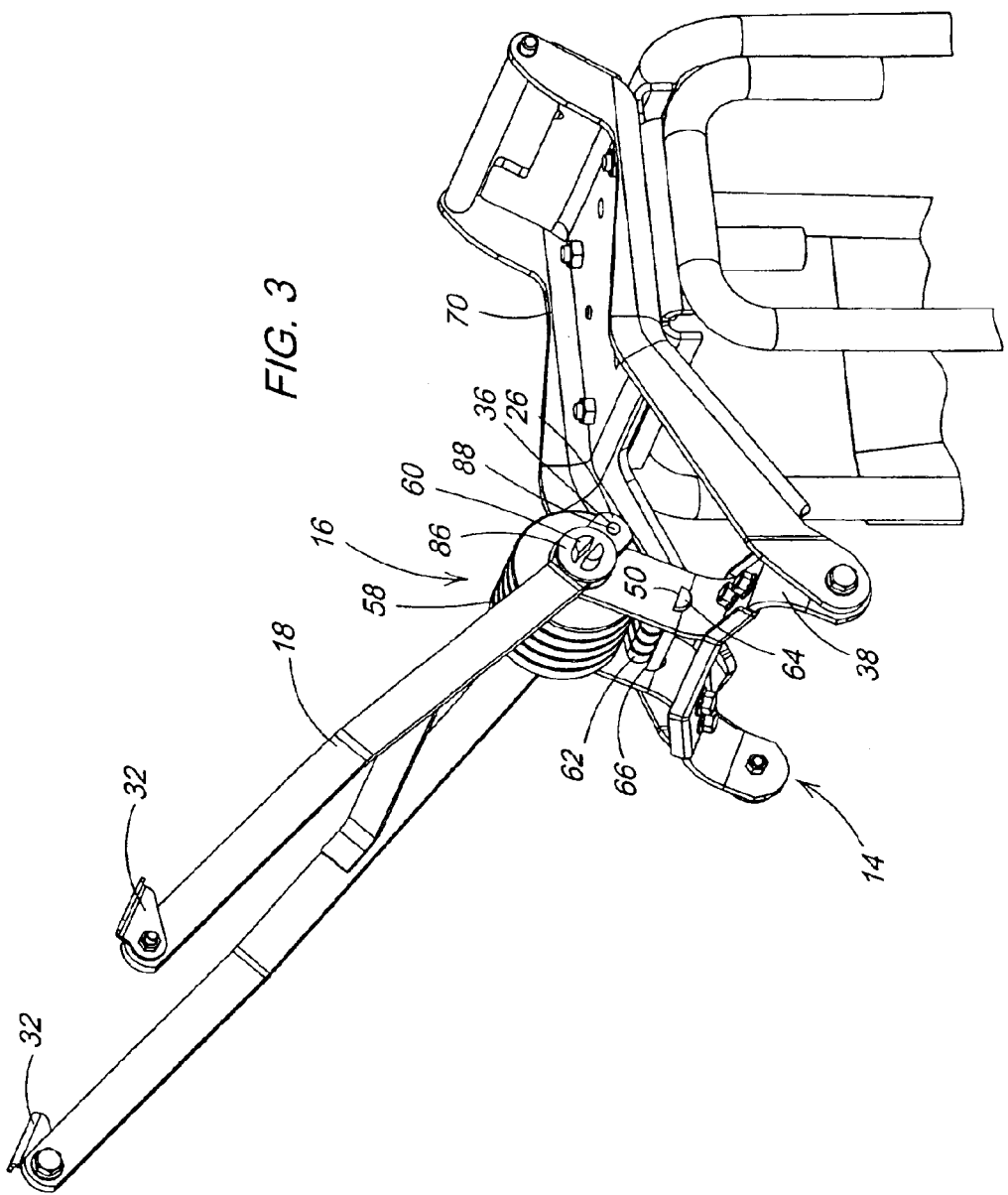
FIG. 3 is a perspective view of the hood support mechanism according to the invention in the raised position; and, FIG. 4 is a perspective view of the hood support mechanism according to the invention in the lowered position.
Figure 4:
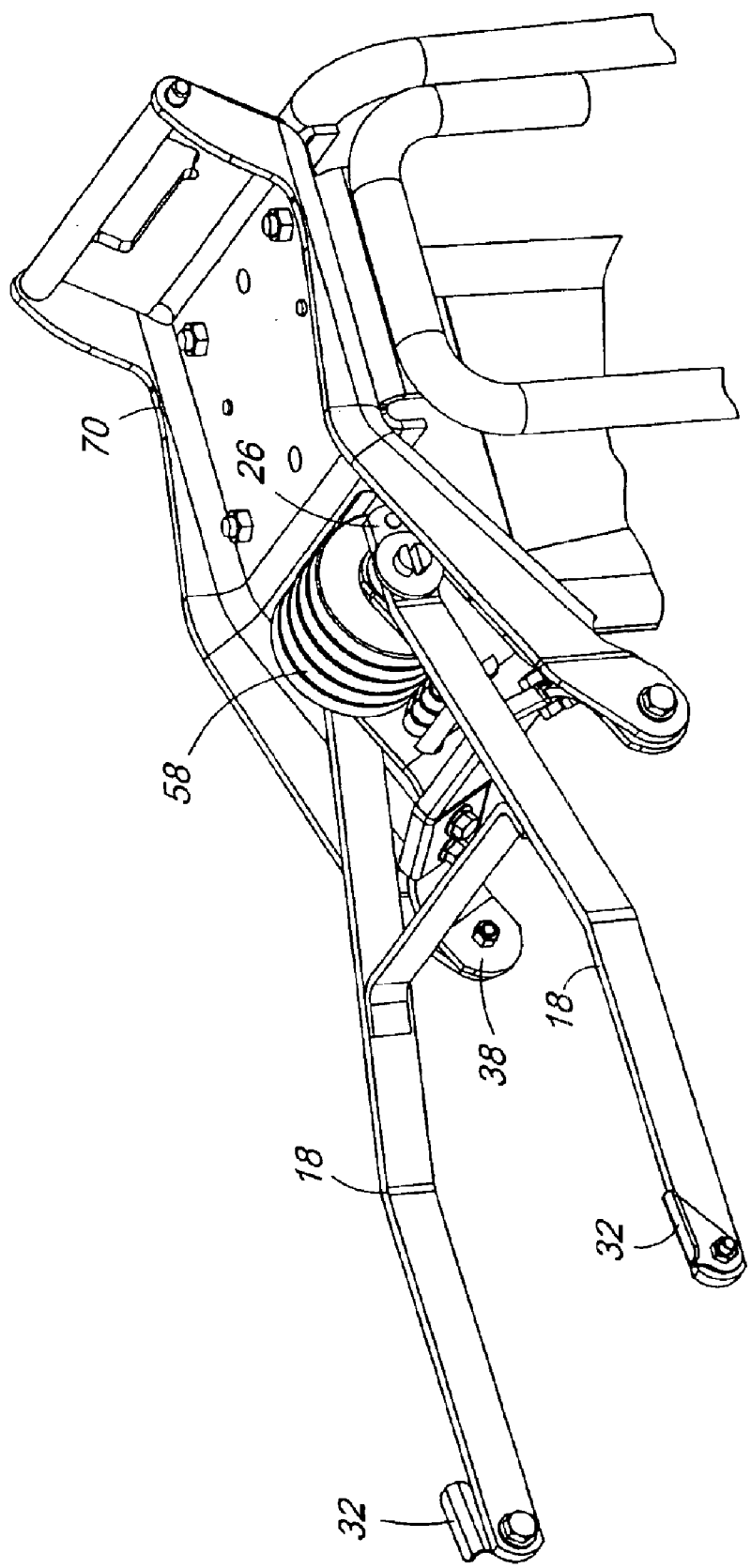

Referring now to FIGS. 3 and 4, the spring arms 38 are pivotally mounted to the spring arm mounting apertures 82 of the hinge bracket 70 by way of appropriate bolts or the like. The spring assembly 16 is captured between spring arms 38 such that the ends of the split pivot pin 60 are journaled in the spring apertures 48. Bushings may be provided in the spring apertures 48 to facilitate the free rotation of the split pivot pin 60 relative to the spring arms 38. Similarly, the half-moon pin 64 is captured in the half-moon apertures 50 of the spring arms 38. Because the hook shaped terminus 62 of spring member 58 abuts the flat surface 66 of half-moon pin 64 the spring member 58 is fixed against rotation independent of the split pivot pin 60, that is to say that rotation of the split pivot pin 60, holding the first end of the spring member 58, only causes the spring member 58 to wind or unwind, depending on the direction of rotation, it does not cause the entire spring member 58 to rotate, due to the stop provided by the half-moon pin 64. The spring arm assembly 14 and spring assembly 16 are captured by the laterally spaced third portions 26 of the hood arms 18 because the split pivot pin 60 extends through the first apertures 34 located at the second ends 30 of the hood arms 18. It should be noted that at least one washer 86 having a pair of half-moon apertures 87 is provided for each hood arm 18. The half-moon apertures 87 of the washers 86 are sized to mateably receive the half-moon pins 60A and 60B which comprise the split pivot pin 60. The washers 86 are preferably welded or otherwise affixed to the hood arms 18 at the first apertures 34 such that the split pivot pin 60 is fixed against rotation relative to the hood arms 18. That is to say the hood arms 18 can only rotate with the split pivot pin 60 and vice versa. Thus, rotation of the hood arm assembly 12 relative to the spring arm assembly 14 necessarily winds or unwinds the spring member 58, depending on the direction of rotation.

As previously described the hood arms 18 are attached to the hood support 84 by way of hood mounting flanges 32 that pivot relative to the hood arms 18. Accordingly, the hood support 84 is affixed to the vehicle indirectly via the hood arms 18 and directly at the hinge bracket 70. Thus, as the hood is raised it pivots at the hinge bracket 70 and is supported by the hood support mechanism 10. More particularly, the spring member 58 is biased to pivot the hood arms 18 upwardly, clockwise, as viewed in the Figures, and towards the hood support 84, while the spring arms 38 pivot counter-clockwise, forward, as viewed in the Figures when the hood is lifted and thus tending to raise the hood support 84 and hold the hood support 84 in a raised position such as shown in FIG. 3. A stop pin 88 is provided in the second aperture 36 at the second end 30 of hood arms 18 to limit the amount of relative rotation between the hood arms 18 and the spring arms 38. When the hood is lowered the bias force of the spring member 58 is overcome and the hood arms 18 pivot counter-clockwise away from the hood support 84 while the spring arms 38 pivot clockwise and rearward to the position shown in FIG. 4. The strength of spring member 58 varies little with changes in temperature and is selected so that it is sufficient to hold the hood support 84 in its raised position without the use of an additional prop rod or the like. Further the wide spacing of the first ends 28 of hood arms 18 and that of third portions 46 of spring arms 38 allows for clearance of hydraulic lines and other items under the hood and likewise significantly enhances the torsional rigidity of the hood when the hood is open.

Thus it can be seen that the objects of the invention have been satisfied by the structure presented above. While in accordance with the patent statutes, only the best mode and preferred embodiment of the invention has been presented and described in detail, it is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A support mechanism for supporting a hood with respect to a vehicle to which the hood is pivotally coupled, the support mechanism comprising:

a pair of laterally spaced first arms each having a first end pivotally coupled to the vehicle and having a second end;

a pair of laterally spaced second arms each having a first end pivotally coupled to the second end of one of the first arms, and having a second end for engaging and supporting the hood;

a resilient member coupled between the first and second arms and biased to urge the second ends of the second arms upwardly and towards the hood;

wherein a lateral distance between the first ends of the first arms is greater than the lateral distance between the second ends of the first arms and the first ends of the second arms and the lateral distance between the second ends of the second arms is greater than the lateral distance between the second ends of the first arms and the first ends of the second arms whereby the torsional rigidity of the hood and clearance under the hood is increased.

2. The support mechanism of claim 1, wherein:
a pivot pin couples the second arm to the first arm, the resilient member being coiled around the pivot pin.

3. The support mechanism of claim 1, wherein:
a pivot pin couples the second arm to the first arm, the pivot pin being non-rotatably attached to at least one of the second arms, the resilient member being coiled around the pivot pin, the resilient member having an inner end anchored to the pivot pin and having an outer end anchored to the other of the arms.

4. The support mechanism of claim 1, wherein:
a pivot pin couples the second arm to the first arm, the pivot pin being non-rotatably attached to the second arm, the resilient member being coiled around the pivot pin, the resilient member having an inner end anchored to the pivot pin and having an outer end anchored to the first arms.

5. The support mechanism of claim 1, wherein:
the lateral distance between the first arms is maintained by a brace which is affixed between the first arms.

6. The support mechanism of claim 1, wherein:
the lateral distance between the second arms is maintained by a brace which is affixed between the second arms.

* * * * *